United States Patent
Kluthe et al.

(10) Patent No.: US 9,231,418 B2
(45) Date of Patent: Jan. 5, 2016

(54) METHOD FOR MONITORING A CHARGING PROCESS OF A BATTERY

(75) Inventors: Christian Kluthe, Leinfelden-Echterdingen (DE); Francois Mothais, Stuttgart (DE); Berengar Krieg, Gerlingen (DE); Stephan Leuthner, Leonberg (DE); Martin Lang, Hessigheim (DE)

(73) Assignee: Robert Bosch GmbH, Stuttgart (DE)

( * ) Notice: Subject to any disclaimer, the term of this patent is extended or adjusted under 35 U.S.C. 154(b) by 435 days.

(21) Appl. No.: 13/806,108

(22) PCT Filed: May 10, 2011

(86) PCT No.: PCT/EP2011/057535
§ 371 (c)(1),
(2), (4) Date: Mar. 8, 2013

(87) PCT Pub. No.: WO2011/160891
PCT Pub. Date: Dec. 29, 2011

(65) Prior Publication Data
US 2013/0207464 A1    Aug. 15, 2013

(30) Foreign Application Priority Data
Jun. 25, 2010   (DE) .......................... 10 2010 030 548

(51) Int. Cl.
*H02J 7/00* (2006.01)
*H01M 10/44* (2006.01)
(Continued)

(52) U.S. Cl.
CPC ........... *H02J 7/0031* (2013.01); *B60L 11/1809* (2013.01); *H01M 10/44* (2013.01);
(Continued)

(58) Field of Classification Search
CPC ... H02J 7/0031; H02J 7/0068; B60L 11/1809; B60L 11/1806; H01M 10/44; H01M 10/482; H01M 10/0525; H01K 10/425
USPC .......................... 320/118, 128, 132, 136, 163
See application file for complete search history.

(56) References Cited

U.S. PATENT DOCUMENTS 5,179,337 A * 1/1993 Staarman et al. ............. 320/136
6,285,161 B1   9/2001 Popescu
(Continued)

FOREIGN PATENT DOCUMENTS

CN          101459348 A    6/2009
JP          2007-195272 A  8/2007
(Continued)

OTHER PUBLICATIONS

International Search Report corresponding to PCT Application No. PCT/EP2011/057535, mailed Apr. 25, 2012 (German and English language document) (5 pages).

*Primary Examiner* — Vuthe Siek
(74) *Attorney, Agent, or Firm* — Maginot, Moore & Beck LLP

(57) ABSTRACT

A method is described for monitoring a charging process of a battery, in which cell voltages of a plurality of battery cells are measured at regular time intervals, and loading of the battery by a process of switching on an additional electrical load is prevented if the measured cell voltage of one battery cell exceeds a predetermined cell voltage threshold value. A motor vehicle is also described, which is configured to carry out the method according to the disclosure during a battery charging process. In addition, a battery system is described, in which a controller is configured to determine an estimated value as a function of measured battery parameters during a charging process of the battery. The estimated value corresponds to the maximum temperature in the battery if the charging process is continued without interruption.

11 Claims, 4 Drawing Sheets

(51) Int. Cl.
*H01M 10/48* (2006.01)
*B60L 11/18* (2006.01)
*H01M 10/625* (2014.01)
*H01M 10/6569* (2014.01)
*H01M 10/613* (2014.01)

(52) U.S. Cl.
CPC .......... *H01M10/443* (2013.01); *H01M 10/486* (2013.01); *H01M 10/613* (2013.01); *H01M 10/625* (2013.01); *H01M 10/6569* (2013.01); *H02J 7/0068* (2013.01)

(56) References Cited

U.S. PATENT DOCUMENTS

| 8,847,554 B2* | 9/2014 | Sunderlin | 320/136 |
| 2008/0151454 A1* | 6/2008 | Uhl | 361/87 |
| 2009/0153104 A1* | 6/2009 | Matsuura et al. | 320/153 |

FOREIGN PATENT DOCUMENTS

| JP | 2008-500223 A | 1/2008 |
| JP | 2009-123560 A | 6/2009 |
| JP | 2009-148046 A | 7/2009 |

* cited by examiner

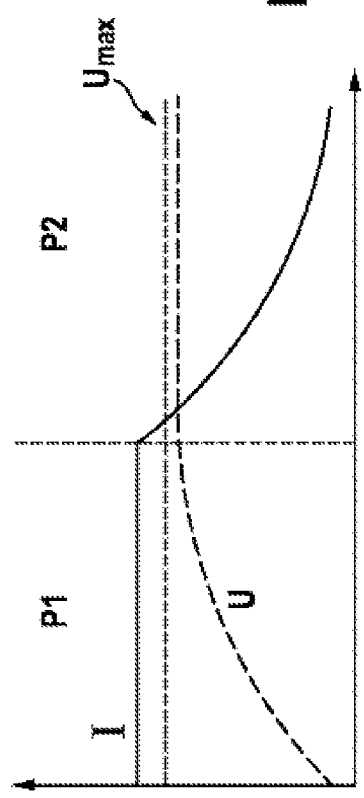
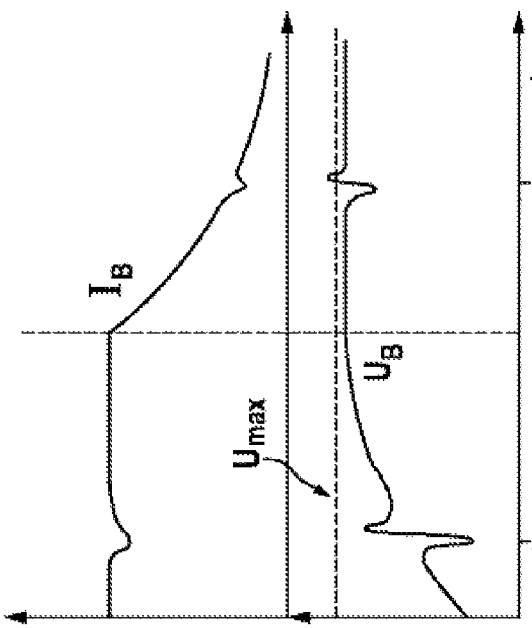
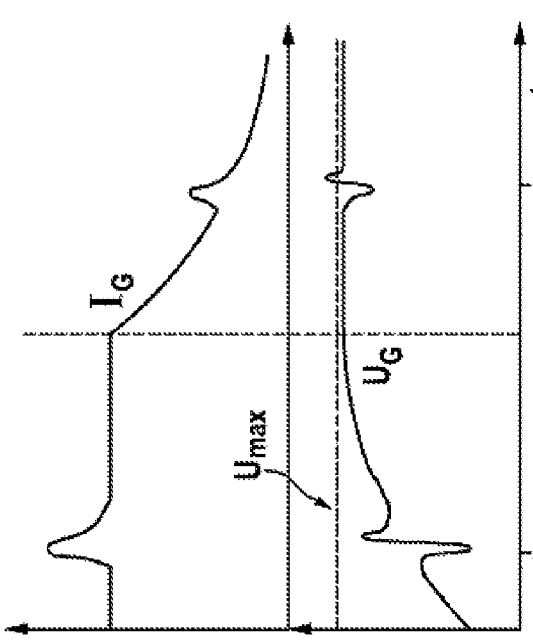

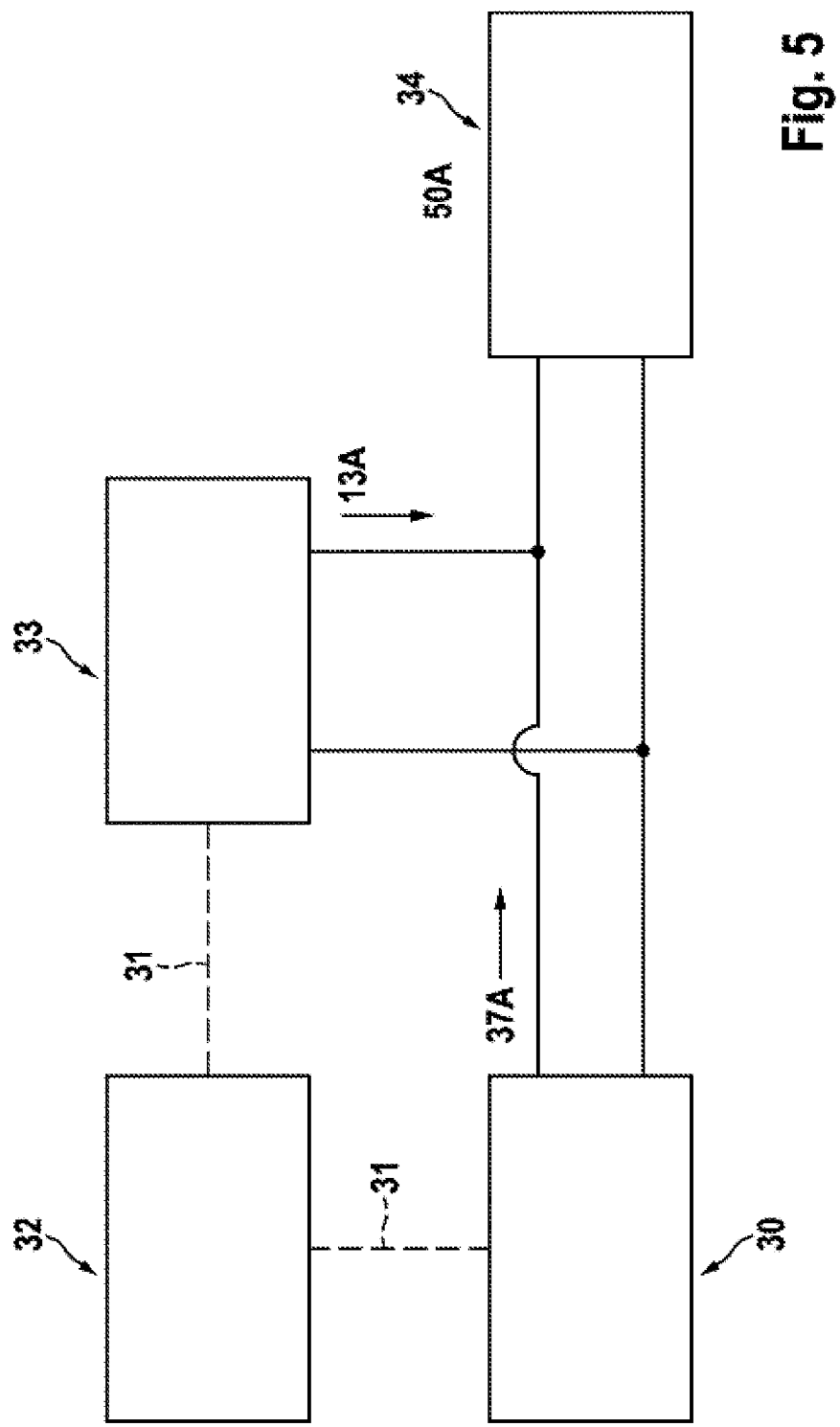

METHOD FOR MONITORING A CHARGING PROCESS OF A BATTERY

This application is a 35 U.S.C. §371 National Stage Application of PCT/EP2011/057535, filed on May 10, 2011, which claims the benefit of priority to Serial No. DE 10 2010 030 548.0, filed on Jun. 25, 2010 in Germany, the disclosures of which are incorporated herein by reference in their entirety.

The present disclosure relates to a method for monitoring a charging process of a battery, to a battery system and to a motor vehicle which is designed to carry out the method.

BACKGROUND

In hybrid vehicles and electric vehicles, batteries using lithium-ion or nickel-metal hydride technology are used, said batteries having a large number of electrochemical battery cells connected in series. A battery management system is used to monitor the battery and is intended to ensure both monitoring of safety and a service life which is as long as possible. For this purpose, the voltage of each individual battery cell is measured together with the battery current and the battery temperature, and a state estimation (for example of the state of charge or of the state of aging of the battery) is made. In order to maximize the service life, it is helpful to know the maximum capacity of the battery at a given time, that is to say the maximum amount of electrical power which can be output or taken up. If this capacity is exceeded, the aging of the battery can be greatly accelerated.

Also during a charging process of the battery, the battery management system also continuously monitors significant parameters of the battery in order to avoid damage to individual battery cells or to the entire battery. FIG. 1 shows a typical time profile of a charging current I and of a cell voltage of a battery cell U during a charging process, known from the prior art, of a lithium-ion battery. In a first phase P1, referred to as the CC (constant current) phase, the battery is charged with a constant current, with the result that the cell voltage of a battery cell increases. From the point when a predetermined limiting voltage is reached, the battery is recharged in a second phase P2, referred to as the CV (constant voltage) phase at a constant voltage whose value corresponds, for example, to a cell voltage of 4.1 V, and is below a critical maximum cell voltage (switch-off limit $U_{max}$). The charging current decreases approximately exponentially in this phase P2. The charging process is ended as soon as either a predetermined charging time is reached or a predetermined value of the charging current is undershot. The described charging strategy is referred to after to its characteristic phases as CC-CV charging.

During the charging process, the battery management system of the battery continuously monitors the temperatures in the battery modules which divide the battery, as well as monitoring all the cell voltages. In the event of the predetermined safety thresholds for a maximum cell temperature or a minimum or maximum cell voltage (for example $U_{max}$ in FIG. 1) being undershot or exceeded, the battery management system automatically opens the high voltage contactor of the battery and thereby switches it off (to a de-energized state). This safety function is required to protect the battery against irreparable damage which in extreme cases could also lead to instability of the battery pack. The case of a raised battery temperature (above a predetermined operating temperature) is also to be avoided as far as possible during operation since it entails accelerated aging of the battery pack.

For the abovementioned reasons, also during the charging process the battery management system continuously signals the values of the cell voltages and module temperatures to a control device of a charging device which is used to charge the battery. During the charging process, the battery heats up owing to thermal power loss. In order to avoid a situation in which the battery leaves the permitted temperature range during the charging process, as soon as the battery temperature exceeds a predetermined limiting value a main control device of an electric motor vehicle which comprises the battery switches on an air-conditioning compressor.

FIG. 2a shows the time profile of a current $I_G$ and of a voltage $U_G$ in or on an overall system which comprises the battery, the air-conditioning compressor and the charging device, during the charging process of the battery. FIG. 2b shows the simultaneous profile of a charging current $I_B$ and of a charging voltage $U_B$ in or on the battery. At two points $t_1$ and $t_2$ there is in each case a switch-on process of the air-conditioning processor. This switch-on process requires at short notice an increase in the current $I_G$ which cannot be made available by the charging device alone but instead also has to be supplied from the battery. This results in the charging current $I_B$ briefly collapsing at both times. The control device of the charging device measures the dip in the charging current and immediately smoothes out the power loss by increasing the charging voltage $U_B$. Since the air-conditioning compressor requires a very much lower current even shortly after the switch-on process, the battery is charged with an extremely high charging voltage $U_B$ shortly after the switch-on process (see abrupt increase in $U_B$ shortly after the times $t_1$ and $t_2$ in FIG. 2b). In the event of the charging process of the battery being in a phase with relatively low cell voltages (for example time $t_1$), this is unproblematic. In contrast, in the event of the charging process of the battery being in a phase with relatively high cell voltages (for example time $t_2$), uncontrolled switching off of the battery can occur owing to the infringement of the maximum cell voltage limit.

SUMMARY

According to the disclosure, a method for monitoring a charging process of a battery, preferably of a lithium-ion battery, is made available. The battery, a charging module which supplies the battery with a charging current, and at least one additional electrical consumer are components of an electrical circuit. The battery comprises a plurality of battery cells connected in series. The method comprises the following steps: cell voltages of a plurality of battery cells are measured at regular time intervals, and loading of the battery by a switch-on process of the additional electrical consumer is prevented if the measured cell voltage of a battery cell exceeds a predetermined cell voltage threshold value. As a result of these method steps, uncontrolled switching off of the battery owing to infringement of the maximum cell voltage limit is prevented by switching on the additional consumer.

The battery and the additional consumer may be parts of a motor vehicle, and a main control device of the motor vehicle can actuate the additional consumer. The additional consumer can also be an electric cooling unit for cooling the battery, in particular an air-conditioning compressor.

According to one preferred embodiment of the disclosure there is provision that in addition to the cell voltages of a plurality of battery cells, a battery charging current and at least one temperature of the battery are measured at regular time intervals; an estimated value which corresponds to an estimated maximum temperature in the battery when the charging process is continued uninterruptedly, is determined as a function of the cell voltages, of the battery charging current and of the temperature; and the electric cooling unit is switched on if the estimated value exceeds a predetermined temperature threshold value, but is not switched on if the measured cell voltage of a battery cell exceeds the predetermined cell voltage threshold value. As a result, it is ensured that the switching on of the cooling unit is brought forward chronologically into an earlier phase of the charging process of the battery, in which the cell voltages tend to be still further below the cell voltage threshold value, that is to say into a phase in which switching on of the cooling unit does not yet entail the risk of uncontrolled switching off of the battery owing to the infringement of the maximum cell voltage limit.

A hysteresis of the cell voltages can be taken into account during the determination of the estimated value. The estimated value can be determined by a battery management unit and sent to the main control device of the motor vehicle. Furthermore, the estimated value can be transmitted by the battery management unit to the main control device of the vehicle via a CAN (Controller Area Network) bus.

A further inventive aspect relates to a battery system having a battery, preferably a lithium-ion battery, and a battery management unit which is connected to the battery, wherein the battery comprises a plurality of battery cells which are connected in series. The battery management unit has a plurality of voltage measuring units, designed to measure a cell voltage of, in each case, one battery cell, at least one temperature measuring unit, which is designed to measure a temperature of the battery, at least one current measuring unit, which is designed to measure a battery charging current, and a controller, which is connected to the voltage measuring units, to the temperature measuring unit and to the current measuring unit. The controller is designed to determine, during a charging process of the battery, an estimated value as a function of the battery charging current, of the cell voltages and of the temperature, which estimated value corresponds to the maximum temperature in the battery when the charging process is continued uninterruptedly. This ensures that, in an overall system comprising the battery system, a cooling unit for cooling the battery can be switched on the basis of the estimated value, already in an earlier phase of the charging process of the battery in which the cell voltages tend to be even further below the cell voltage threshold value, that is to say in a phase in which switching on of the cooling unit does not yet entail the risk of uncontrolled switching off of the battery owing to the infringement of the maximum cell voltage limit.

It is possible to arrange a plurality of temperature measuring units in the battery which are designed to measure the temperature in various regions of the battery. A hysteresis of the cell voltages can be taken into account during the determination of the estimated value. Furthermore, the estimated value can be output via an interface of the battery management unit, in particular a CAN interface.

A further inventive aspect relates to a motor vehicle having a battery system which comprises a battery, preferably a lithium-ion battery, and a battery management unit which is connected to the battery; furthermore having a main control device and having at least one additional electrical consumer, wherein the battery system is connected to a drive system of the motor vehicle, and the main control device actuates the additional consumer. The motor vehicle is designed to carry out the inventive method during a charging process of the battery. In one preferred embodiment, the motor vehicle comprises the battery system according to the disclosure.

BRIEF DESCRIPTION OF THE DRAWINGS

Exemplary embodiments of the disclosure are explained in more detail with reference to the drawings and the following description. In the drawings:

FIG. 1 shows a typical time profile of a charging current and of a cell voltage of a battery cell during a charging process, known from the prior art, of a lithium-ion battery, FIG. 2 shows a time profile of a current and of a voltage in an overall system (a) and a simultaneous profile of a charging current and of a charging voltage in a battery (b) from the prior art, FIG. 5 shows wiring of the battery system according to the disclosure in an exemplary embodiment of a motor vehicle according to the disclosure.

DETAILED DESCRIPTION

Figure 3:
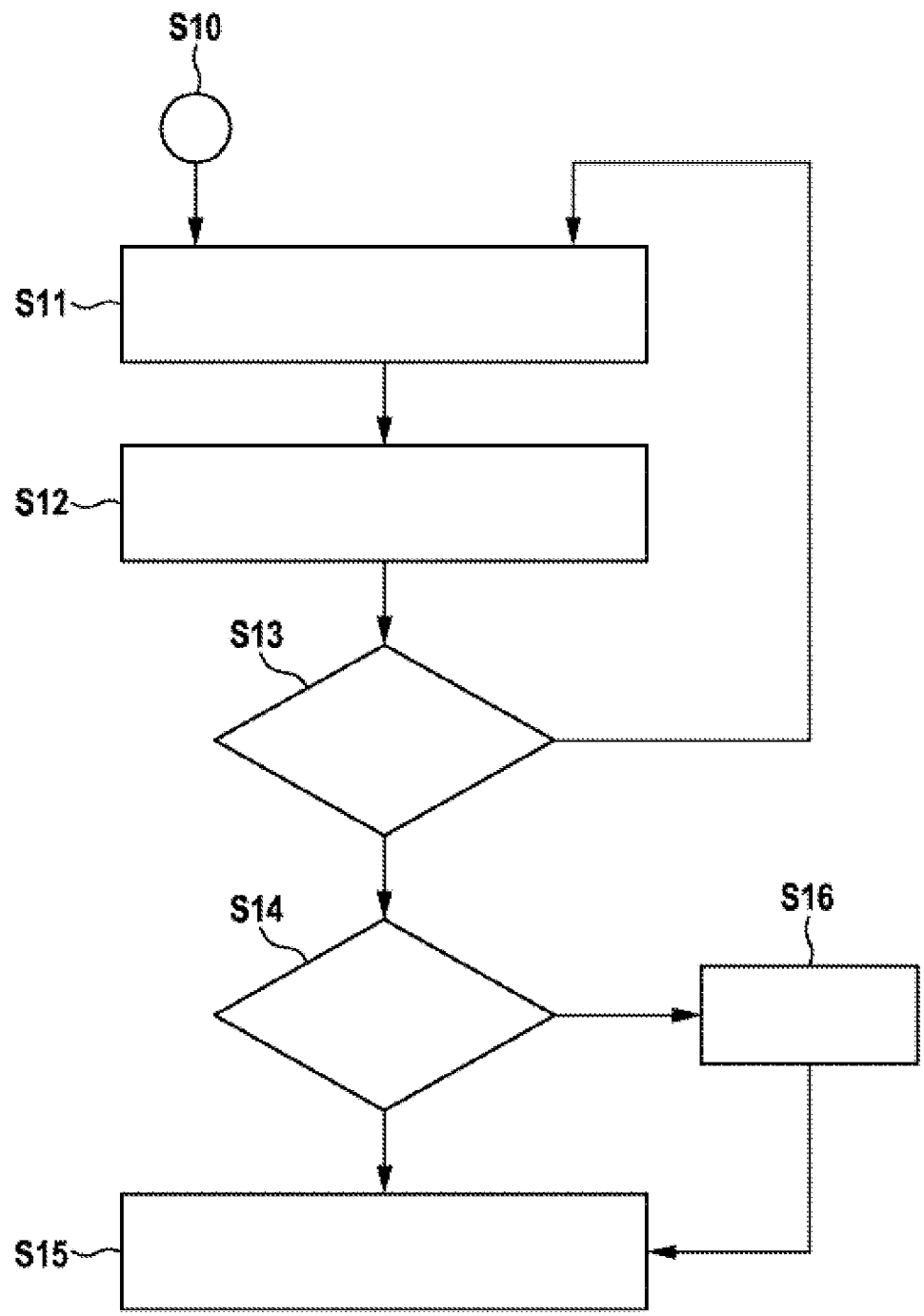
FIG. 3 shows an exemplary embodiment of a method according to the disclosure.

FIG. 3 shows an exemplary embodiment of a method according to the disclosure. The method serves to monitor a charging process of a battery which is arranged in the exemplary embodiment in a motor vehicle. Furthermore, the motor vehicle comprises, as an additional consumer, an air-conditioning compressor which is suitable for cooling the battery, as well as a main control device which actuates the air-conditioning compressor. The method starts in step S10. In step S11, cell voltages of a plurality of battery cells which are connected in series, a battery charging current as well as a plurality of temperatures are measured in various regions of the battery during the charging process of the battery. In step S12, a hypothetical maximum temperature in the battery is estimated as a function of the battery charging current, of the cell voltages and of the temperatures, which hypothetical maximum temperature can be reached in a region of the battery if the charging process is uninterrupted and is continued without switching on the air-conditioning compressor. In order to calculate the value of the hypothetical maximum temperature, a prediction function can be installed in software of a battery management system of the battery, which prediction function predicts, from the indicated measured values, a maximum temperature in a battery cell which can occur up to the conclusion of a CC-CV charging operation within the battery if the air-conditioning compressor is not switched on. The prediction function can take into account a hysteresis in the battery cells which is characterized in that during the charging and discharging process the cell voltage differs from the quiescent voltage. The level of the hysteresis is higher the higher the respective charging current or discharging current. A model for predicting the maximum temperature as a function of the specified parameters is determined by previous measurements on a first prototype battery.

In step S13, the estimated hypothetical maximum temperature in the battery is compared by the master control device with a predetermined temperature threshold value which corresponds to a temperature which is not to be exceeded in the battery in order to avoid irreversible damage thereto. If the estimated hypothetical maximum temperature in the battery is not higher than the predetermined temperature threshold value, branching back to the start of the method in step S11 occurs, and otherwise in step S14 the master control device checks whether none of the measured cell voltages is higher than a predetermined cell voltage threshold value. If this is the case, in a step S15 the air-conditioning compressor which is suitable for cooling the battery is switched on by the master control device.

If, on the other hand, at least one of the measured cell voltages is higher than the predetermined cell voltage threshold value, in step S16 the master control device aborts the charging process of the battery and/or the battery is electrically disconnected before the air-conditioning compressor is switched on in S15.

As a result, at least during the charging process of the battery, the taking up of power by the air-conditioning compressor is blocked and a situation in which a current which is required for the power take-up of the air-conditioning compressor is also supplied by the battery is prevented.

Figure 4:
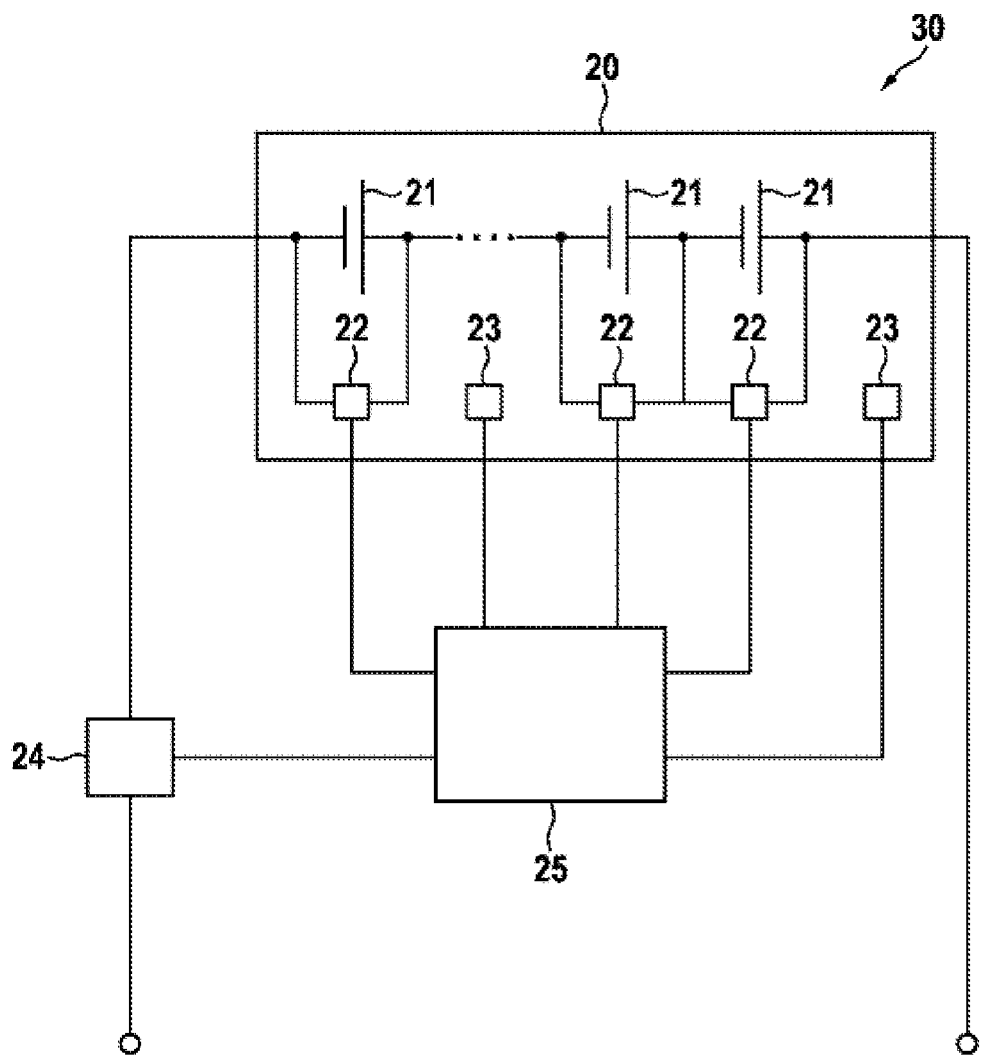
FIG. 4 shows an exemplary embodiment of a battery system according to the disclosure.

FIG. 4 shows an exemplary embodiment of an inventive battery system, denoted in its entirety by 30. A battery 20 comprises a plurality of battery cells 21 connected in series. A plurality of voltage measuring units 22 are provided which each measure a cell voltage of a battery cell. Furthermore, temperature measuring units 23 are arranged in various regions of the battery. A current measuring unit 24 measures a battery charging current during a charging process of the battery 20. The voltage measuring units 22, the temperature measuring units 23 and the current measuring unit 24 are connected to a controller 25 which is designed to estimate a hypothetical maximum temperature in the battery during a charging process of the battery, as a function of the measured values supplied by the voltage measuring units 22, the temperature measuring units 23 and the current measuring unit 24, which hypothetical maximum temperature can be reached in a region of the battery if the charging process is uninterrupted and continued without switching on an air-conditioning compressor. The controller 25 can be designed to calculate the hypothetical maximum temperature as in the method described in the description of FIG. 3.

FIG. 5 shows wiring of the battery system 30 according to the disclosure in an exemplary embodiment of a motor vehicle according to the disclosure. The inventive battery system 30 which is illustrated in FIG. 4, a main control device of the motor vehicle 32 and a charging module 33, which supplies the battery system 30 with a charging current and which is not necessarily part of the inventive motor vehicle, are connected to a common bus system, in particular to a controlled area network (CAN) bus 31. The battery system 30, the charging module 33 and an air-conditioning compressor 34 are connected to one another as components of an electrical circuit, wherein all three components are connected in parallel. The battery management unit of the battery system 30 according to the disclosure sends, in real time, the following values to the master controlled device of the motor vehicle 32 via the CAN bus 31, and updates them cyclically:
(1) maximum cell voltage value within the battery 20;
(2) minimum cell voltage value within the battery 20; and
(3) the hypothetical maximum temperature in the battery 20 which can be reached in a region of the battery 20 if the charging process is uninterrupted and is continued without switching on the air-conditioning compressor 34.

If the hypothetical maximum temperature in the battery 20, sent by the battery management unit of the inventive battery system 30 to the main control device of the motor vehicle 32, exceeds a predetermined temperature threshold value, the main control device of the motor vehicle 32 switches on the air-conditioning compressor 34 provided that the condition mentioned below is met.

If the air-conditioning compressor 34 is switched on during a CC-CV charging operation of the battery 20, said air-conditioning compressor 34 requires at short notice a current of, for example, 50 A. This current cannot be made available solely by the charging module but instead must also be supplied by the battery system 30, as a result of which the charging current dips. This dip is detected basically by the master control device of the motor vehicle 32 and signalled to a controller of the charging module 33, in response to which the controller of the charging module 33 compensates by increasing the charging voltage, but this can either damage a battery cell 21 in which the cell voltage value exceeds a predetermined cell voltage threshold value or leads to uncontrolled switching off of the battery 20 by the battery management unit.

For this reason, the master control device of the motor vehicle 32 according to the disclosure instead does not switch on the air-conditioning compressor 34 if the maximum cell voltage value sent by the battery management unit of the battery system 30 according to the disclosure to the master control device of the motor vehicle 32 exceeds a predetermined cell voltage threshold value within the battery 20.

The invention claimed is:

1. A method for monitoring a charging process of a battery having a plurality of battery cells connected in series, the battery being connected to a charging module configured to supply the battery with a charging current, and to at least one additional electrical consumer, the method comprising:
measuring, with sensors connected to a main control device, cell voltages of the plurality of battery cells at regular time intervals; and
preventing, with the main control device, a loading of the battery caused by a switch-on process of the at least one additional electrical consumer, by at least one of (i) actuating the at least one additional electrical consumer with the main control device to disconnect the at least one additional electrical consumer from the battery, and (ii) operating the charging module with the main control device to abort the charging process of the battery, if a cell voltage of the measured cell voltages of the plurality of battery cells exceeds a predetermined cell voltage threshold value.

2. The method as claimed in claim 1, wherein:
the battery, the main control device, and the at least one additional electrical consumer are parts of a motor vehicle; and
the at least one additional electrical consumer is an electric cooling unit configured to cool the battery.

3. The method as claimed in claim 2, further comprising:
measuring a battery charging current and at least one temperature of the battery at regular time intervals;
determining an estimated temperature value, corresponding to a maximum temperature in the battery when the charging process is continued uninterruptedly, as a function of the cell voltages, of the battery charging current, and of the temperature;
switching on the electric cooling unit if the estimated temperature value exceeds a predetermined temperature threshold value; and
preventing the switching on of the electric cooling unit if a cell voltage of the measured cell voltages of the plurality of battery cells exceeds the predetermined cell voltage threshold value.

4. The method as claimed in claim 3, further comprising:
taking a hysteresis of the cell voltages into account during the determination of the estimated temperature value.

5. The method as claimed in claim 3, wherein the estimated temperature value is determined by a battery management unit and sent to the main control device of the motor vehicle.

6. The method as claimed in claim 5, wherein the estimated temperature value is transmitted by the battery management unit to the main control device of the vehicle via a CAN bus.

7. A battery system comprising:
a battery including a plurality of battery cells connected in series; and a battery management unit connected to the battery, the
battery management unit comprising:
- a plurality of voltage measuring units configured to measure a cell voltage of, in each case, a battery cell of the plurality of battery cells;
- at least one temperature measuring unit configured to measure a temperature of the battery;
- at least one current measuring unit configured to measure a battery charging current; and
- a controller connected to the voltage measuring units, to the temperature measuring unit, and to the current measuring unit, the controller being configured to determine, during a charging process of the battery, an estimated temperature value, corresponding to a maximum temperature in the battery when the charging process is continued uninterruptedly, as a function of the battery charging current, of the cell voltages and of the temperature.

8. The battery system as claimed in claim 7, the battery management unit further comprising: wherein
- a plurality of temperature measuring units arranged in the battery and configured to measure temperatures in various regions of the battery.

9. The battery system as claimed in claim 7, wherein the controller is configured to output the estimated temperature value via a CAN interface of the battery management unit.

10. A motor vehicle comprising:
a drive system
a battery system connected to the drive system, the battery system comprising:
- a battery including a plurality of battery cells;
- a battery management unit connected to the battery;
- at least one additional electrical consumer; and
- a main control device configure to:
  - measure cell voltages of the plurality of battery cells at regular time intervals; and
  - prevent a loading of the battery caused by a switch-on process of the at least one additional electrical consumer, by at least one of (i) actuating the at least one additional electrical consumer to disconnect the at least one additional electrical consumer from the battery, and (ii) operating the charging module to abort the charging process of the battery, if a cell voltage of the measured cell voltages of the plurality of battery cells exceeds a predetermined cell voltage threshold value.

11. The motor vehicle as claimed in claim 10, the battery management unit comprising:
- a plurality of voltage measuring units configured to measure a cell voltage of, in each case, a battery cell of the plurality of battery cells;
- at least one temperature measuring unit configured to measure a temperature of the battery;
- at least one current measuring unit configured to measure a battery charging current; and
- a controller connected to the voltage measuring units, to the temperature measuring unit, and to the current measuring unit, the controller being configured to determine, during a charging process of the battery, an estimated temperature value, corresponding to a maximum temperature in the battery when the charging process is continued uninterruptedly, as a function of the battery charging current, of the cell voltages and of the temperature.

* * * * *